(12) United States Patent
Bertosa et al.

(10) Patent No.: US 7,860,619 B2
(45) Date of Patent: Dec. 28, 2010

(54) AUTOMOTIVE SCAN TOOL WITH ENHANCED AUDIO, VIDEO AND VOICE RECOGNITION FUNCTIONALITY

(75) Inventors: Thomas Bertosa, Chardon, OH (US); Hamid Namaky, South Russell, OH (US); Neil Somos, Brecksville, OH (US)

(73) Assignee: SPX Corporation, Charlotte, NC (US)

( * ) Notice: Subject to any disclaimer, the term of this patent is extended or adjusted under 35 U.S.C. 154(b) by 877 days.

(21) Appl. No.: 11/709,824

(22) Filed: Feb. 23, 2007

(65) Prior Publication Data
US 2008/0208403 A1 Aug. 28, 2008

(51) Int. Cl.
*G01M 17/00* (2006.01)
*G06F 19/00* (2006.01)

(52) U.S. Cl. .............................. 701/29; 701/33; 701/35; 340/438

(58) Field of Classification Search ................... 701/29, 701/30, 33, 25, 35; 455/456; 340/438
See application file for complete search history.

(56) References Cited

U.S. PATENT DOCUMENTS

| | | | |
|---|---|---|---|
| 6,094,609 A * | 7/2000 | Arjomand | 701/29 |
| 6,282,469 B1 * | 8/2001 | Rogers et al. | 701/29 |
| 6,459,969 B1 * | 10/2002 | Bates et al. | 701/29 |
| 2003/0036832 A1 * | 2/2003 | Kokes et al. | 701/33 |
| 2003/0187557 A1 * | 10/2003 | Shockley | 701/39 |
| 2003/0215128 A1 * | 11/2003 | Thompson | 382/141 |
| 2004/0102879 A1 | 5/2004 | Raichle et al. | 701/29 |
| 2005/0021198 A1 * | 1/2005 | Jackson et al. | 701/29 |
| 2006/0173591 A1 * | 8/2006 | Knapp et al. | 701/33 |
| 2007/0244611 A1 * | 10/2007 | Brozovich | 701/29 |

* cited by examiner

*Primary Examiner*—Tan Q Nguyen
(74) *Attorney, Agent, or Firm*—Baker & Hostetler LLP

(57) ABSTRACT

A diagnostic tool for a vehicle, includes a signal translator communicating with the vehicle in at least one protocol, an input unit for inputting information, a processor controlling a software according to the input information from the input unit and communication with the vehicle from the signal translator, the processor controlling a reception of diagnostic data of the vehicle through the signal translator, an input and output unit receiving and transmitting audio and video signals controlled by the processor, a memory storing a software controlled by the processor, the memory storing audio and video information, and transferring the audio and video information through the input and output unit; and a display unit displaying information according to the received and processed audio and video signals stored in the memory.

22 Claims, 5 Drawing Sheets ent invention relates generally to an automotive diagnostic tool. More particularly, the present invention relates to an automotive diagnostic tool having advanced audio, video and voice-recognition capabilities.

AUTOMOTIVE SCAN TOOL WITH ENHANCED AUDIO, VIDEO AND VOICE RECOGNITION FUNCTIONALITY

FIELD OF THE INVENTION

The present invention relates generally to an automotive diagnostic tool. More particularly, the present invention relates to an automotive diagnostic tool having advanced audio, video and voice-recognition capabilities.

BACKGROUND OF THE INVENTION

Onboard control computers have become prevalent in motor vehicles, but as safety, economy, and emissions requirements have continued to tighten, friction braking systems, and traction control devices have not met the requirements set out in government regulations and the implicit demands of competitors' achievements. Successive generations of onboard control computers have acquired increasing data sensing and retention capability as the electronics have advanced.

Present external diagnostic and display apparatus, known as diagnostic tools, are commonly limited to reporting the data acquired by the onboard control computer itself. Increasingly, subtle subsystem failures in vehicles overload the ability of maintenance technicians, not simply to read the faults detected and stored by the diagnostic tools themselves, but to combine those readings with peripheral measurements and deduce corrective actions with both speed and accuracy.

Currently in the automotive industry, there are both stand alone and hand-held diagnostic testers or tools used in connection with motor vehicle maintenance and repair. For example, hand-held diagnostic tools have been used to trouble-shoot faults associated with vehicular control units. Diagnostic tools detect faults based on Diagnostic Trouble Codes or DTCs that are set in the vehicle's onboard control computer. A DTC can be triggered and stored when there is a problem with the vehicle. A technician then retrieves the DTC using a diagnostic tool, repairs the associated problem and then deletes the DTC from the vehicle's computer.

The current diagnostic tools are limited in the input and output multimedia capabilities, thus limiting the usefulness of the diagnostic tool for a user. The limits on the current tools output capabilities include, for example, problems with the method of indicating the DTC. The current diagnostic tools show the DTC on a basic display that is capable of viewing only when a user directly looks at the diagnostic tool. The user must be in close proximity and in viewing distance from the diagnostic tool. For example, when a diagnostic tool detects a DTC, a user must directly view the tool in order to see the DTC readout. If a user is unable to view or has difficulty in seeing the diagnostic tool, there is a problem with obtaining the readout on the tool. There is a need to remotely use the diagnostic tool that present tools are unable to provide. The limitations of the output methods of today's diagnostic tools, creates certain burdens upon the user including the limited manners of receiving the DTC output of the diagnostic tools.

The current diagnostic tool limitations of input capabilities stem from sparse input methods. A user has to enter instructions through a keypad of the diagnostic tool. Therefore, the user must again be in close proximity to the diagnostic tool in order to enter instructions and additional data. Further, additional data may also be limited to interfaces such as a keypad. Such methods are slow and cumbersome when a plurality of instructions and data have to be entered quickly and accurately. Again, the present diagnostic tools do not include the remote capability in terms of the input of information.

The user of the diagnostic tool can be forced to use additional devices in order to supplement the limitations of the input and output methods of today's diagnostic tools. For example, if the diagnostic tool cannot perform a certain function because of the limitations in input or output, then a second device that does include the missing capabilities must be used. Further, a user is forced to receive help from a second user. For example, if the user cannot read the diagnostic tool, a second user may have to read the information and relay it to the user.

Accordingly, it is desirable to provide a method and apparatus that will allow enhanced capabilities to a user or technician to use a diagnostic tool to determine the output of the diagnostic tool and to input information into the diagnostic tool in a remote manner with respect to multimedia related information.

SUMMARY OF THE INVENTION

The foregoing needs are met, to a great extent, by the present invention, wherein in one aspect a technique and apparatus are provided that will allow a technician to use a diagnostic tool to determine the nature of a problem, with enhanced input and output capabilities by providing multimedia capabilities including enhanced audio, video and voice-recognition.

In accordance with one embodiment of the present invention, a diagnostic tool for a vehicle, includes a signal translator communicating with the vehicle in at least one protocol; an input unit for inputting information; a processor controlling a software according to the input information from the input unit and communication with the vehicle from the signal translator, the processor controlling a reception of diagnostic data of the vehicle through the signal translator; an input and output unit receiving and transmitting audio and video signals controlled by the processor; a memory storing a software controlled by the processor, the memory storing audio and video information, and transferring the audio and video information through the input and output unit; and a display unit displaying information according to the received and processed audio and video signals stored in the memory. The diagnostic tool can also include an imaging unit transferring information to the diagnostic tool. The diagnostic tool can also output the audio signal through a transducer. The diagnostic tool can also recognize voice signals received through a transducer in the diagnostic tool.

In accordance with another embodiment of the present invention, a method for a diagnostic tool for a vehicle, includes linking the diagnostic tool with a diagnostic computer of the vehicle through the data link connector of the vehicle; communicating with the diagnostic computer of the vehicle in a communication protocol; selecting among a plurality of parameters for input or output of audio and video signals; recording diagnostic data of the vehicle by the diagnostic tool according to the selected parameters; and remotely indicating diagnostic trouble codes of the vehicle through a transducer or display using software stored in memory.

In accordance with yet another aspect of the present invention, a method of operating a diagnostic tool for a vehicle, includes a means for communicating with the vehicle in at least one protocol; a means for manually inputting information; a means for controlling a software according to the input information from the input unit and communication with the vehicle from the signal translator, the controlling means controlling reception of diagnostic data of the vehicle through the communicating means; a means for receiving and transmitting audio and video signals; a means for storing a software processed by the controlling means, the storing means including audio and video information and transferring the audio and video information through the means for receiving and transmitting audio and video signals; and a means for displaying information according to the received and processed audio and video signals.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
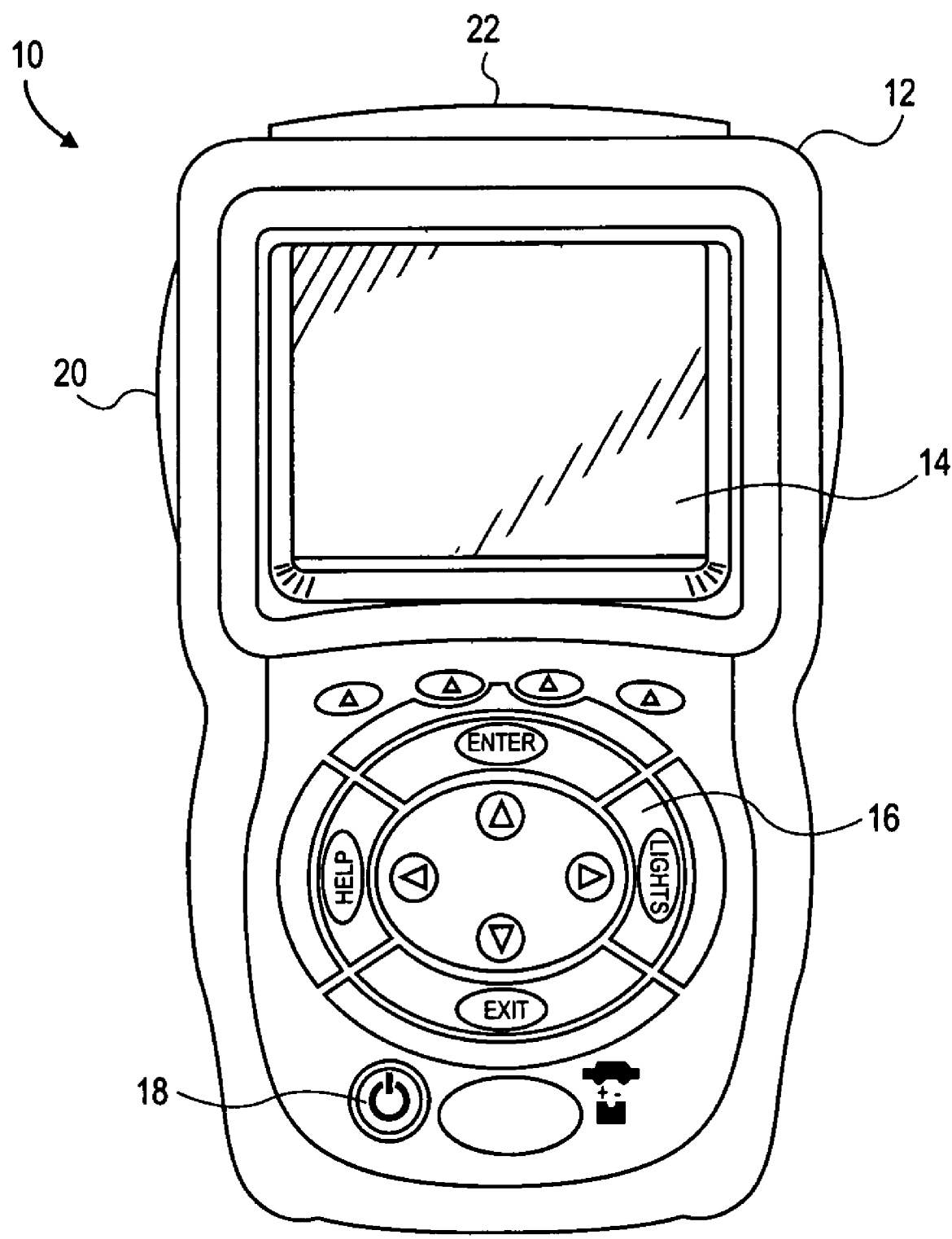
FIG. 1 is a front view illustrating a diagnostic tool according to an embodiment of the invention.

The invention will now be described with reference to the drawing figures, in which like reference numerals refer to like parts throughout. An embodiment in accordance with the present invention provides an apparatus and method that will allow a user, such as a technician, to use a diagnostic tool to determine the nature of a problem, and the tool having enhanced audio, video and voice-recognition capabilities.

Manufacturers have programmed their vehicle onboard computers with complicated methods of detecting a variety of problems. Further, the United States Environmental Protection Agency has mandated that DTCs be set where there are emissions related problems with the vehicle using the Onboard Diagnostic II System, also known as the OBD II system.

However, there are still problems of using the diagnostic tool since there are limitations in the input and output methods of the diagnostic tool. A user is forced to look directly at the diagnostic tool's limited display that may display only the DTC or simple indicator of function being performed. Further, the user is also limited in the diagnostic tool's input methods such as entering instructions or information through the keypad on the diagnostic tool.

In an embodiment of the present invention, the diagnostic tool will run an application that accommodates a display of images taken by a digital camera unit that communicates with the diagnostic tool. The diagnostic tool can also issue audio output including voice emulated audio, thus enabling a talking mode within the diagnostic tool, in order to aid the user. In addition, the diagnostic tool is capable of voice-recognition, record and playback video and sound. Furthermore, the diagnostic tool can transmit video, sound, and other diagnostic information to a personal computer (PC) or other diagnostic equipment. The transmission of audio and video accommodates remote diagnosis of a vehicle away from the location of the vehicle.

An embodiment of the present inventive apparatus is illustrated in FIG. 1. In particular, FIG. 1 is a front view illustrating a diagnostic tool 10 according to an embodiment of the invention. The diagnostic tool 10 can be any computing device, for example, the NEMISYS diagnostic tool from SERVICE SOLUTIONS (part of the SPX Corporation). The diagnostic tool 10 includes a housing 12 to encase the various components of the diagnostic tool 10, such as a display 14, a user interface 16, a power button 18, a memory card reader 20 and a connector interface 22. The display 14 can be any type display, including for example but not limited to, a liquid crystal display (LCD), organic light emitting diode (OLED), field emission display (FED), electroluminescent display (ELD), etc. In addition, the LCD, for example, can be touch screen that both displays and performs the additional task of interfacing between the user and the diagnostic tool 10. The user interface 16 allows the user to interact with the diagnostic tool 10, in order to operate the diagnostic tool as the user prefers. The user interface 16 can include function keys, arrow keys or any other type of keys that can manipulate the diagnostic tool 10 in order to operate the diagnostic tool through the software. The user interface or input device 16 can also be a mouse or any other suitable input device for the user interface 16, including a keypad, touchpad, etc. The user interface 16 can also include keys correlating to numbers or alphanumeric characters. Moreover, as mentioned above, when the display 14 is touch sensitive, the display 14 can supplement or even substitute for the user interface 16. The power key or button 18 allows the user to turn the power to the diagnostic tool 10 on and off, as required.

A memory card reader 20 can be a single type card reader, such as, but not limited to, a compact flash card, floppy disk, memory stick, secure digital, flash memory or other type of memory. The memory card reader 20 can be a reader that reads more than one of the aforementioned memory such as a combination memory card reader. Additionally, the card reader 20 can also read any other computer readable medium, such as CD (compact disc), DVD (digital video or versatile disc), etc.

The connector interface 22 allows the diagnostic tool 10 to connect to an external device, such as, but not limited to, an ECU (electronic control unit) of a vehicle, a computing device, an external communication device (such as a modem), a network, etc. through a wired or wireless connection. Connector interface 22 can also include connections such as a USB (universal serial bus), FIREWIRE (Institute of Electrical and Electronics Engineers (IEEE) 1394), modem, RS232, RS48J, and other connections to communicate with external devices, such as a hard drive, USB drive, CD player, DVD player, or other computer readable medium devices.

Figure 2:
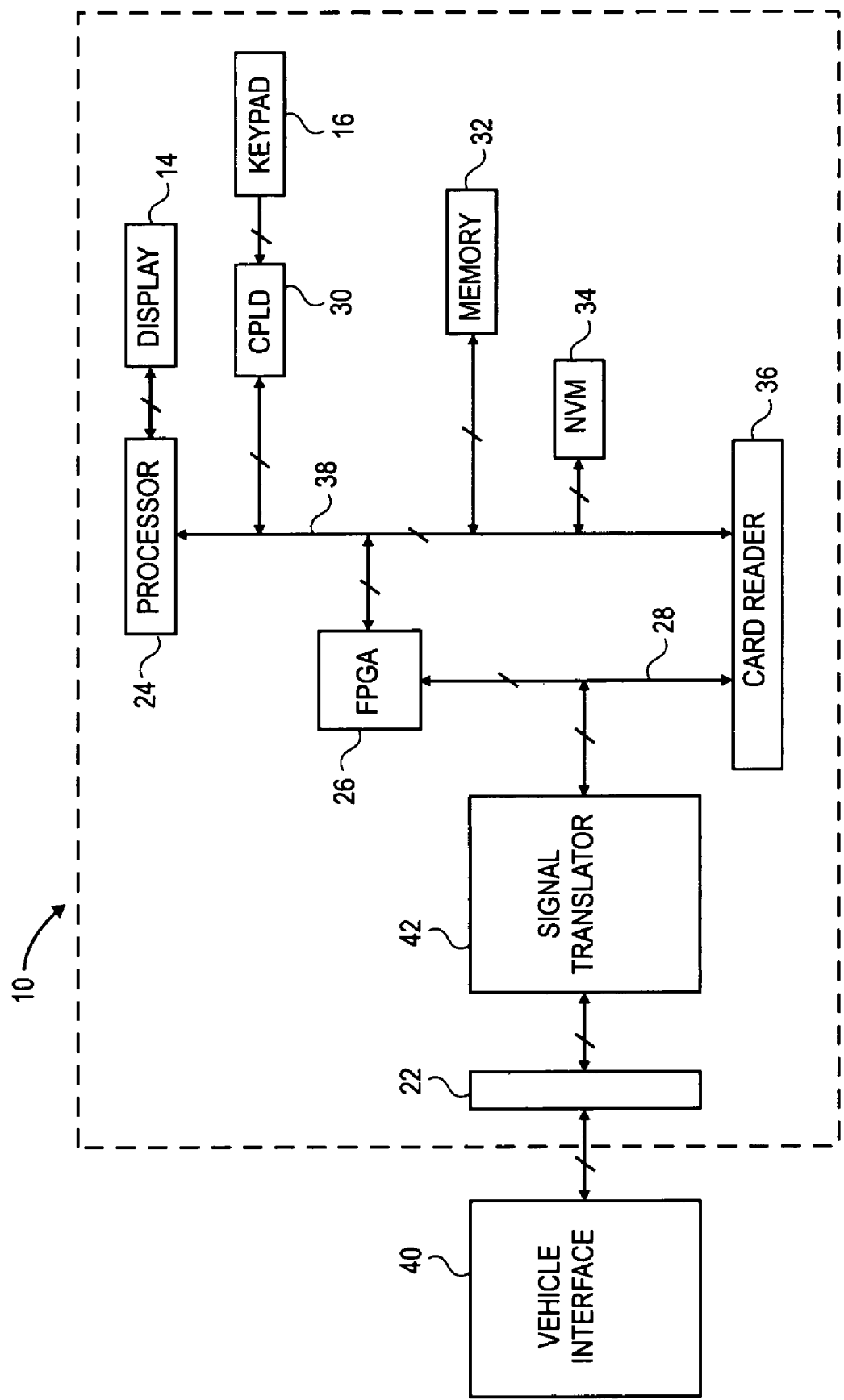
FIG. 2 is a block diagram of the components of a diagnostic tool.

FIG. 2 is a block diagram of the components of a diagnostic tool 10. In FIG. 2, the diagnostic tool 10, according to an embodiment of the invention, includes a processor 24, a field programmable gate array (FPGA) 26, a first system bus 28, the display 14, a complex programmable logic device (CPLD) 30, the user interface 16 in the form of a keypad, a memory subsystem 32, an internal non-volatile memory (NVM) 34, a card reader 36, a second system bus 38, the connector interface 22, and a selectable signal translator 42. A vehicle communication interface 40 is in communication with the diagnostic tool 10 through connector interface 22 via an external cable. The connection between the vehicle communication interface 40 and the connector interface 22 can also be a wireless connection such as BLUETOOTH, infrared device, wireless fidelity (WiFi, e.g. 802.11), etc.

The selectable signal translator 42 communicates with the vehicle communication interface 40 through the connector interface 22. The signal translator 42 conditions signals received from a motor vehicle control unit through the vehicle communication interface 40 to a conditioned signal compatible with the diagnostic tool 10. The translator 42 can communicate with, for example, the communication protocols of J1850 signal, ISO 9141-2 signal, communication collision detection (CCD) (e.g., Chrysler collision detection), data communication links (DCL), serial communication interface (SCI), S/F codes, a solenoid drive, J1708, RS232, controller area network (CAN), or other communication protocols that are implemented in a vehicle.

The circuitry to translate a particular communication protocol can be selected by the FPGA 26 (e.g., by tri-stating unused transceivers) or by providing a keying device that plugs into the connector interface 22 that is provided by diagnostic tool 10 to connect diagnostic tool 10 to vehicle communication interface 40. Translator 42 is also coupled to FPGA 26 and the card reader 36 via the first system bus 28. FPGA 26 transmits to and receives signals (i.e., messages) from the motor vehicle control unit through the translator 42.

FPGA 26 is coupled to the processor 24 through various address, data and control lines by the second system bus 38. FPGA 26 is also coupled to the card reader 36 through the first system bus 28. Processor 24 is also coupled to the display 14 in order to output the desired information to the user. The processor 24 communicates with the CPLD 30 through the second system bus 38. Additionally, the processor 24 is programmed to receive input from the user through the user interface 16 via the CPLD 30. The CPLD 30 provides logic for decoding various inputs from the user of diagnostic tool 10 and also provides the glue-logic for various other interfacing tasks.

Memory subsystem 32 and internal non-volatile memory 34 are coupled to the second system bus 38, which allows for communication with the processor 24 and FPGA 26. Memory subsystem 32 can include an application dependent amount of dynamic random access memory (DRAM), a hard drive, and/or read only memory (ROM). Software to run the diagnostic tool 10 can be stored in the memory subsystem 32. The internal non-volatile memory 34 can be, but not limited to, an electrically erasable programmable read-only memory (EEPROM), flash ROM, or other similar memory. The internal non-volatile memory 34 can provide, for example, storage for boot code, self-diagnostics, various drivers and space for FPGA images, if desired. If less than all of the modules are implemented in FPGA 26, the non-volatile memory 34 can contain downloadable images so that FPGA 26 can be reconfigured for a different group of communication protocols.

Figure 3:
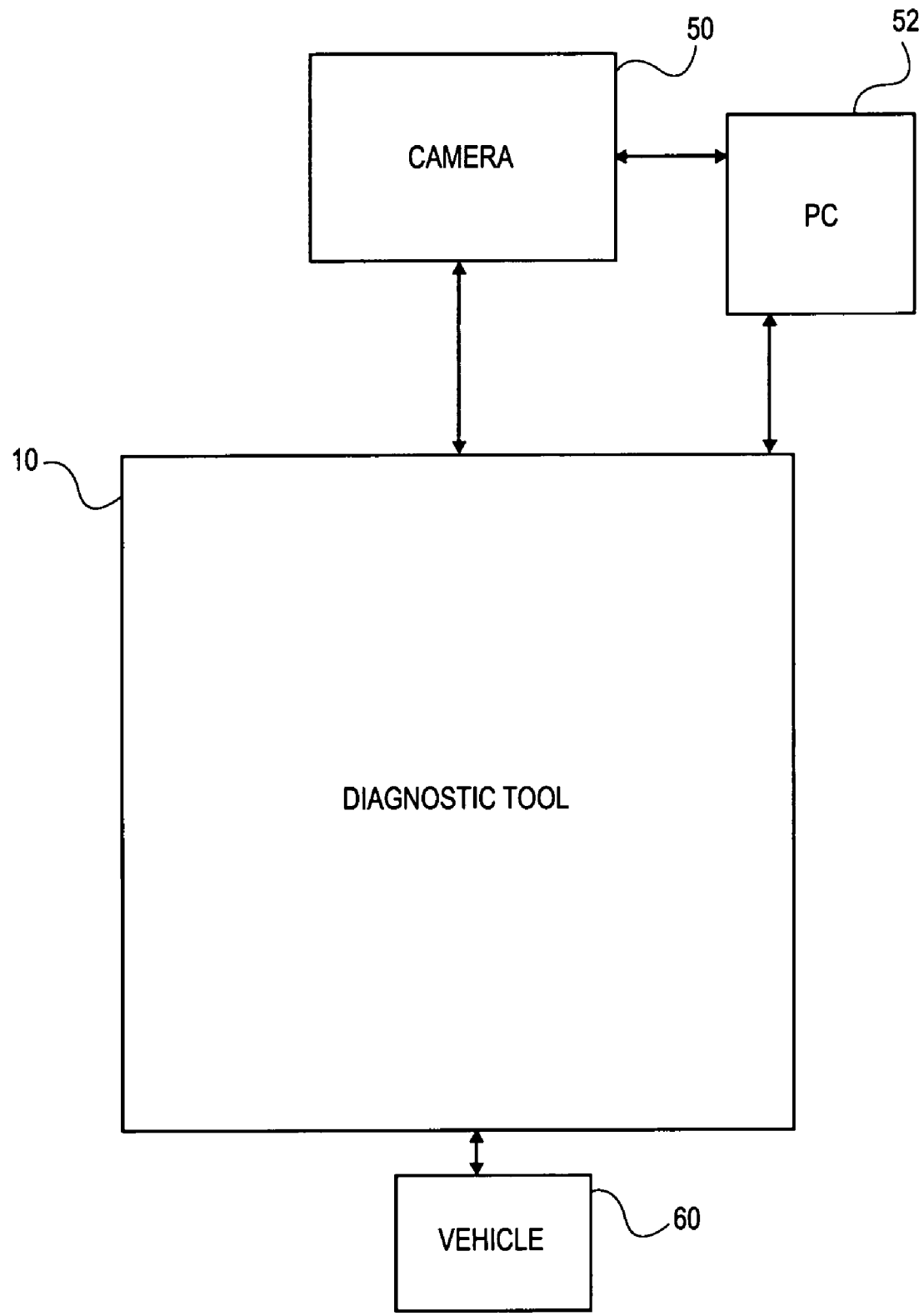
FIG. 3 is a block diagram of a diagnostic tool accommodating video input in accordance with one embodiment of the invention.

FIG. 3 is a block diagram illustrating one embodiment of the present invention. In particular, FIG. 3 illustrates the communication with an image recording device such as a camera that records still images or video. The image recording device can be a digital camera 50 that is capable of recording still images, a series of still images at predetermined times, or a video. The digital camera 50 can be in circuit communication with the diagnostic tool 10, or other automotive pass through device, via serial port, USB (universal serial bus), BLUETOOTH, etc., and transmit images back to the diagnostic tool 10 or a PC 52, where they will be displayed. As shown in FIG. 3, the camera 50 can be connected to the diagnostic tool 10 or through a PC 52.

The diagnostic tool 10 can be used as a pass-through device to allow the PC 52 to communicate with the vehicle 60. The diagnostic tool 10 translates the signals from the signal translator 42 to convert the signals from the vehicle 60 to the signals of the digital camera 50 or the PC 52 to accommodate connection between the diagnostic tool 10 to a digital camera 50, either directly or through the PC 52. The connection between the digital camera 50 and the diagnostic tool 10 can be wired or wireless as shown above by the different methods of connection and protocols. The communication can be bidirectional with communication being transferred from the diagnostic tool 10 to the digital camera 50 and back to the diagnostic tool 10.

A user can use such an apparatus as a bore scope. The user can remove a spark plug in the vehicle 60, and then send the digital camera 50 into the spark plug hole. The bore scope can include the digital camera 50. The user can send instructions from the diagnostic tool 10 to digital camera 50 to take certain still and/or video images of the area inside the spark plug hole of a vehicle 60. The camera 50 then sends the image information back to the diagnostic tool 10 for output on the display 14 of diagnostic tool 10. The images of the cylinder are displayed either on the separate personal computer (PC) 52 or on the diagnostic tool 10. The diagnostic tool 10 can be used to locate lost bolts, rattles on a vehicle during a road test, or provide a second set of eyes for the user. The digital camera 50 can also be used to see if a vehicle's check engine light is at an "ON" state. For example, when a user is in another location in the vehicle 60 with the diagnostic tool 10, the digital camera 50 can be positioned to view the dashboard of a vehicle. Therefore, both time and resources can be saved, as another user is not necessary to notify the first user of the check light being on, or for the first user to move over to see the check light engine each time an adjustment is made by the first user.

Further, the diagnostic tool 10 can be used to count check engine light flashes for older vehicles that use manual codes instead of serial codes. Again, time and resources are saved by the diagnostic tool 10 equipped with enhanced capabilities.

As shown above and will be further shown in detail, the diagnostic tool accommodates remote diagnostic capability. A further example of the remote diagnostic capability of the diagnostic tool 10, includes a vehicle being scanned in one area, state or country, while the scanned data, vehicle's engine, and live images of the testing can be viewed in near real-time or real-time, depending on transmission of data, in a remote second area, state or country. The transmission can be made for example using the Internet or other transmission means of the data. The diagnostic tool 10 can transmit such information either wirelessly (IEEE (Institute of Electrical and Electronics Engineers) 802.11) or through wired method (category 5, 6, 7 Ethernet cable where category 7 cable is for a 10 gigabit transfer) to connect to an access point such as a router or hub for the Internet. For example, the connector interface 22 can be used also to connect wirelessly or through a wired connection to the access point for network 62 connection or simply to another PC 52.

Figure 4:
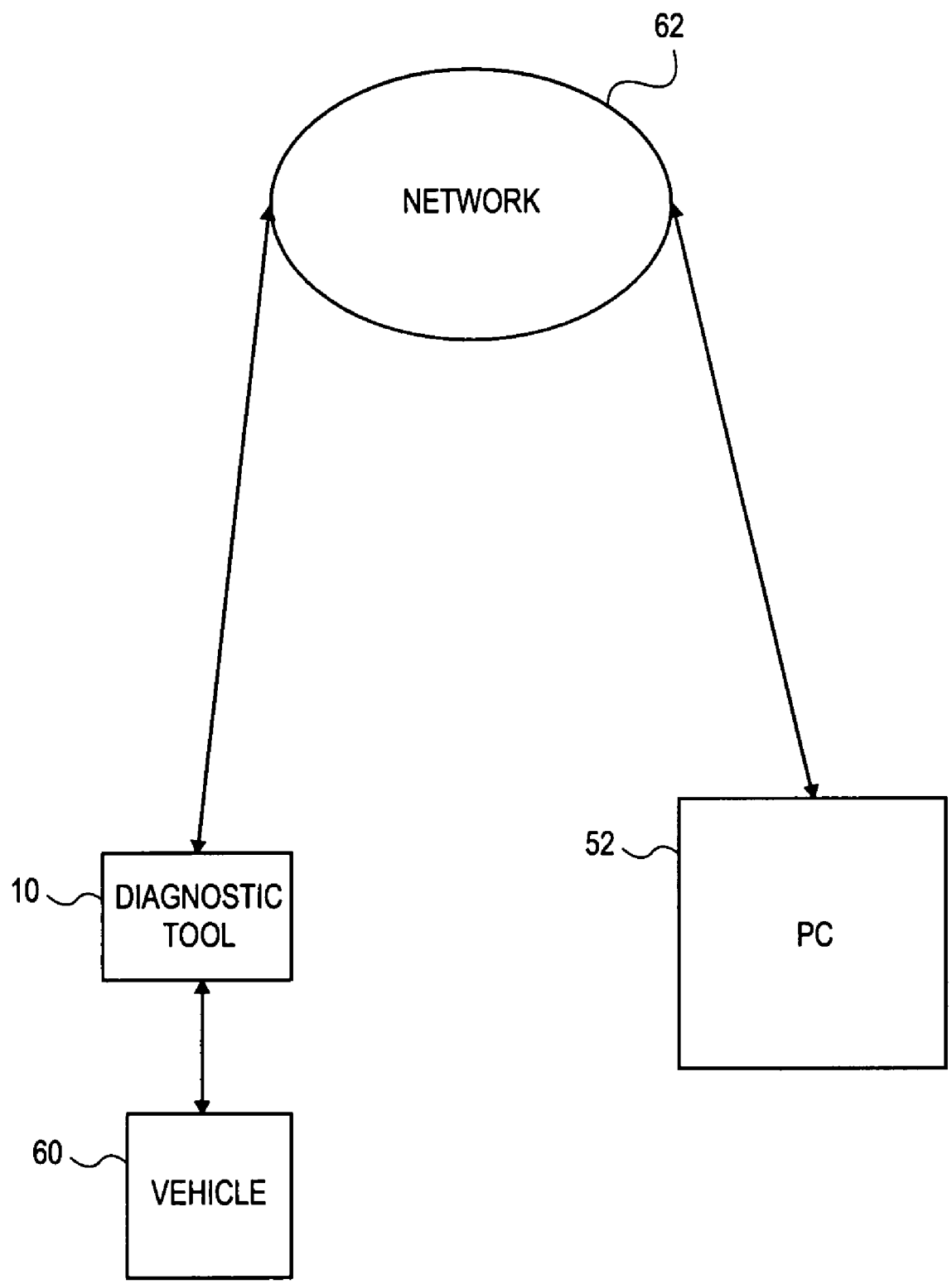
FIG. 4 is a block diagram of the diagnostic tool communicating with a personal computer in a remote location.

As seen in the block diagram of FIG. 4, diagnostic tool 10 scans information of a vehicle 60 in one area, and then through a network 62 such as the Internet, the information can be transmitted to the PC 52 in another area. If the distance is not too great, the IEEE 802.11 protocol or BLUETOOTH can be used to transfer information directly to the PC in a point-to-point connection or through a local area network.

Figure 5:
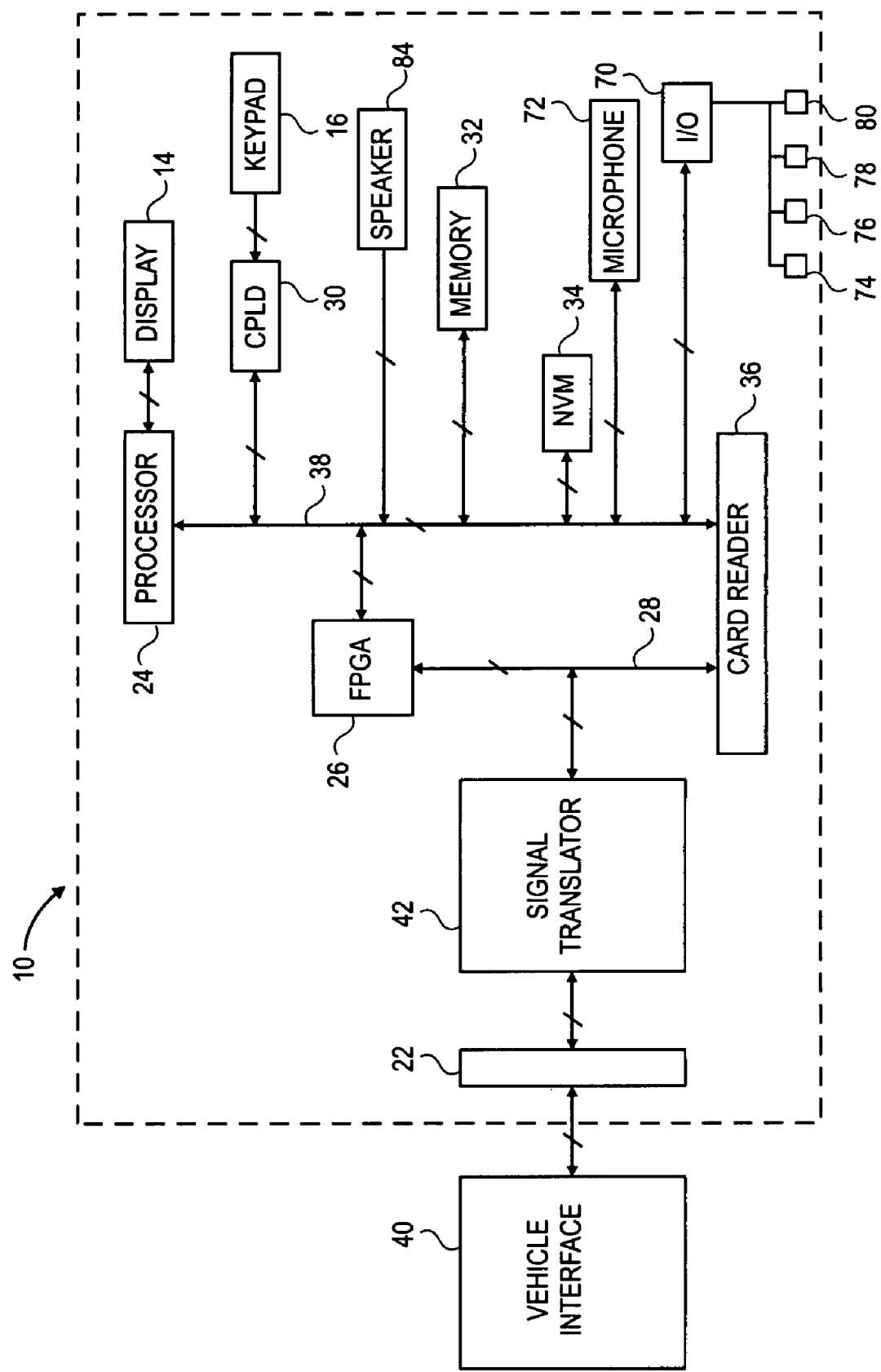
FIG. 5 is a block diagram of the diagnostic tool accommodating input/output of audio and video signals in another embodiment of the invention.

FIG. 5 shows a block diagram of the diagnostic tool 10, including a means for audio input. The diagnostic tool 10 can also record sound with a transducer such as a microphone 72 connected to the diagnostic tool 10 or the microphone 72 being inside the diagnostic tool. As seen in FIG. 5, a microphone jack 74 can be included in an input/output (I/O) port 70 or a built in transducer such as the microphone 72 accommodates the diagnostic tool to input sound information. The sound from the microphone 72 can be recorded in the non volatile memory 34 or other memory device through the card reader 36. The processor 24 controls the recording and storage of the audio information.

The combination of sound and video opens up a whole new environment for scanning, diagnosing, and troubleshooting of vehicles. The diagnostic tool 10 can include line out jacks 76 in the I/O port 70, that can be stereo amplified, so that a transducer such as a speaker can be connected directly to the diagnostic tool 10, or a stereo headphone jack 78 can be included in the I/O 70. An internal speaker 84 can also be included for output of the audio information. The line out jacks 76 have a set constant amplitude in the sound outputted, while the stereo headphone jack 78 can have a volume control through a variable resistor for example. The audio output of the line out jacks 76 in I/O 70 will allow the diagnostic tool to be used for training and showing tutorials. These tutorials will accommodate, for example, the user to learn to use certain functions of the diagnostic tool 10 or to learn other information with regard to the diagnostic tool 10 or its uses for example.

The diagnostic tool 10 can also include video output jacks 80 as seen in the I/O 70. The diagnostic tool can be connected to the vehicle's entertainment system. A user can now show all diagnostic tool screens on the vehicle's display panel and hear all sounds through the vehicle's speakers. The diagnostic tool can play/record MP3, AVI, MPEG, WAV, MOV and other formats of sound and video files through the control of the processor 24, while storing in the information in the non-volatile memory 34 through software running on the memory 32.

The software running in the diagnostic tool 10 in the memory 32 and controlled by processor 24, includes the process for playing and recording the audio and video information. The user can record their own sounds or select from some sounds already stored in the diagnostic tool 10 through the user interface such as the keypad 16. The user can then have these sounds selected when certain events happen. For example, when the diagnostic tool 10 detects DTCs or certain DTCs, the diagnostic tool can play certain mp3 or "wav" format file that says "DTCs present." The diagnostic tool can notify the user audibly for link errors or to make sure the ignition key is on, or inform the user to start the engine. The software stored in the diagnostic tool 10 can execute such preset or customized instructions. With such audio information, not only does the user not have to read the information on the diagnostic tool 10, but the user also does not have to memorize certain tones to indicate a certain problem. The audio files will clearly notify a user without knowing ahead of time what the sound represents in terms of the diagnostic functions of the diagnostic tool 10.

A diagnostic tool 10 with the audio file will talk to the user by informing clearly the notification. The diagnostic tool 10 will be able to inform user that there are DTCs present, or name I/M (inspection and maintenance) monitors that are complete as they become complete. This allows the user to perform a drive test safely by him or herself. The diagnostic tool 10 can provide help to the user by talking to them. If the wrong key is pressed, the diagnostic tool 10 can say what key on the keypad 16 to press instead. The diagnostic tool 10 can provide a tutorial of its functions by explaining to the user what is happening on the display 14. The diagnostic tool 10 can provide information to the user without the user having to view the display 14. The diagnostic tool 10 can generate different sounds based on different data returned from vehicle as shown above. The audio output can be selected between speech synthesis or tone output to indicate the information from the diagnostic tool 10, such as a read out on a sensor.

The diagnostic tool is also capable of providing for voice-recognition. A user can speak and the sound of the user is translated from the sound to an electrical signal through the microphone 72. The electrical signal representing the sound is then translated by the processor 24 via the software on the memory 32. The electrical signal from the microphone 72 is translated into data that can be used by the diagnostic tool 10 or for example but not limited to instructions performed by the diagnostic tool. With the voice recognition, the user, for example can tell the diagnostic tool 10 to turn on or off, run certain diagnostics, while the user is not in physical contact with the diagnostic tool, but in the range of detection of the sound by the microphone 72 of the diagnostic tool 10. Again, the diagnostic tool allows for remote use of the diagnostic tool 10. The diagnostic tool 10 can, for example, trigger a recording of information or trigger a specific event when an instruction by the user's voice command is given and recognized through the processor 24.

The present invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

An example of a computer, but not limited to this example of the computer, that can read computer readable media that includes computer-executable instructions of the present invention includes a processor that controls the computer. The processor uses the system memory and a computer readable memory device that includes certain computer readable recording media. A system bus connects the processor to a network interface, modem or other interface that accommodates a connection to another computer or network such as the Internet. The system bus may also include an input and output interface that accommodates connection to a variety of other devices.

Although an example of the diagnostic tool is shown using a audio and video inputs and outputs, it will be appreciated that other techniques for providing the enhanced multimedia inputs and outputs are available. Also, although the diagnostic tool is useful to diagnose a vehicle and provide such information to the user in a remote manner, so that the user does not have to directly view the diagnostic tool, other diagnosing techniques can be used for other types of apparatus and systems.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for diagnosing a vehicle, comprising:
   a signal translator communicating with the vehicle in at least one protocol;
   an input device for inputting information;
   a processor controlling a software according to the input information from the input device and communication with the vehicle from the signal translator, the processor controlling a reception of diagnostic data of the vehicle through the signal translator;
   an input and output unit receiving and transmitting audio and video signals controlled by the processor;
   a memory storing the software controlled by the processor, the memory storing audio and video information, and transferring the audio and video information through the input and output unit; and
   a display unit displaying information according to the received and processed audio and video signals stored in the memory and data received from the vehicle, wherein the processor recognizing input audio signals and translating into data for view on the display and instructions for the software diagnosing the vehicle.

2. The diagnostic tool of claim 1, wherein the memory further comprising of a volatile memory unit and a non-volatile memory unit, the non-volatile memory unit storing the recorded and received audio and video signals.

3. The diagnostic tool of claim 1, further comprising an image recording unit providing video signals to the diagnostic tool through a port in the input and output unit.

4. The diagnostic tool of claim 1, further comprising a connector interface connecting the signal translator with a vehicle interface through one of a wired and wireless link to allow for recording of the diagnostic data between the diagnostic tool and the vehicle, and a link connecting a computer for remote display of the output of the diagnostic tool.

5. The diagnostic tool of claim 1, further comprising of a housing encasing the signal translator, input device, input and output unit, processor, memory, and display unit.

6. The diagnostic tool of claim 1, wherein the diagnostic tool interfaces with a remote computer for processing of the audio and video signals outputted through the input and output unit.

7. The diagnostic tool of claim 1, further comprising a transducer for recording and outputting audio signals processed through the processor.

8. The diagnostic tool of claim 7, wherein diagnostic trouble codes detected are displayed through the display or outputted through the transducer.

9. A method of operating a diagnostic tool for a vehicle, comprising:
   linking the diagnostic tool with a diagnostic computer of the vehicle through a data link connector of the vehicle;
   communicating with the diagnostic computer of the vehicle in a communication protocol;
   selecting from among a plurality of parameters for input or output of audio and video signals;
   recording, outputting and inputting diagnostic data of the vehicle by the diagnostic tool according to the selected parameters; and
   remotely indicating diagnostic trouble codes of the vehicle through a transducer or display using software stored in memory.

10. The method of claim 9, further comprising:
    transferring the recorded diagnostic data to a personal computer coupled through a network to the diagnostic tool.

11. The method of claim 9, further comprising of inputting video signals recorded through an image device.

12. The method of claim 9, further comprising of automatically initiating the recording of diagnostic information through voice-recognition and input of information according to recognized voice commands.

13. The method of claim 9, further comprising of displaying video information and outputting of audio information from data stored in memory.

14. The method of claim 9, further comprising of remotely instructing and receiving information from the diagnostic tool.

15. The method of claim 9, further comprising of remotely displaying data generated and received by the diagnostic tool through a computer connected via a network.

16. The method of claim 9, further comprising of recording and playing audio and video files stored in the diagnostic tool.

17. The method of claim 9, further comprising of receiving image information recorded remotely from the an image capturing device in communication with the diagnostic tool through a personal computer.

18. The method of claim 17, further comprising of wirelessly transmitting audio and video information from external recording devices to the diagnostic tool.

19. A system for a diagnostic tool of a vehicle, comprising:
    a signal translator communicating with the vehicle in at least one protocol;
    an input device for inputting information;
    a processor controlling a software according to the input information from the input device and communication with the vehicle from the signal translator, the processor controlling reception of diagnostic data of the vehicle through the signal translator;

an input and output unit receiving and transmitting audio and video signals that is in communication with the processor;

a memory storing the software processed by the processor, the memory including audio and video information and transferring the audio and video information through the input and output unit;

a display unit displaying information according to the received and processed audio and video signals and data received from the vehicle, wherein the processor recognizing input audio signals and translating into data for view on the display; and a housing encasing the signal translator, input device, input and output unit, processor, memory, and display unit.

20. The diagnostic tool of claim 19, wherein the memory further comprising a volatile memory unit and a non-volatile memory unit, the non-volatile memory unit storing the recorded and received audio and video signals.

21. The diagnostic tool of claim 19, further comprising an image recording unit providing audio and video signals through the input and output unit.

22. The diagnostic tool of claim 19, further comprising a transducer for recording and outputting audio signals processed through the processor.

* * * * *